United States Patent [19]
Cooper et al.

[11] Patent Number: 5,369,375
[45] Date of Patent: Nov. 29, 1994

[54] SINEWAVE GENERATING CIRCUIT AND AMPLITUDE DEMODULATOR

[75] Inventors: Stephen R. W. Cooper, Tustin; David W. Shank, Big Rapids; Carl A. Munch, Southfield, all of Mich.; Nadi S. Findikli, Forest, Va.

[73] Assignee: Nartron Corporation, Reed City, Mich.

[21] Appl. No.: 23,400

[22] Filed: Feb. 26, 1993

Related U.S. Application Data

[63] Continuation-in-part of Ser. No. 737,389, Jul. 29, 1991, Pat. No. 5,210,490, which is a continuation-in-part of Ser. No. 427,641, Oct. 26, 1989, which is a continuation-in-part of Ser. No. 296,183, Jan. 11, 1989.

[51] Int. Cl.$^5$ ............... G01B 7/14; H01F 21/02; G08C 19/06; G08C 19/12
[52] U.S. Cl. ............... 329/347; 324/207.16; 340/870.31; 327/105; 327/129
[58] Field of Search ............... 329/347; 328/14; 324/207.16, 207.17, 207.18; 340/870.3, 870.31, 870.32

[56] References Cited

U.S. PATENT DOCUMENTS 5,180,987 1/1993 Wendt ................... 328/14

OTHER PUBLICATIONS

Signetics Data Sheet AN 1182—Dec. 1988 pp. 5-363—5-375, Zahid Rahim.
Signetics Data Sheet AN 1181—Copyright Dec. 1988 pp. 5-359—5-362, Zahid Rahim.
Signetics Data Sheet AN 1180 © Dec. 1988 pp. 5-344—5-358, Hadley et al.
Signetics Data Sheet AN 118 © Dec. 1988 pp. 5-329—5-339, Application Note.
Signetics Data Sheet NE 5520 © Apr. 28, 1988 pp. 5-324—5-328, Product Specification.

*Primary Examiner*—Siegfried H. Grimm
*Attorney, Agent, or Firm*—Watts, Hoffmann, Fisher & Heinke

[57] ABSTRACT

An integrated circuit for driving a sensor includes an oscillator for providing a first clock signal synchronized to a periodic waveform supplied by an external source. A second clock signal in the form of a uni-polar square wave is derived from the first clock signal. A sinewave signal is generated by consecutively selecting voltage steps from a resistor ladder under control of the second clock signal. A low-pass filter removes from the sinewave signal higher frequency harmonics generated by switching through the steps of the resistor ladder. A linear amplifier utilizes an external capacitor to couple the filtered sinewave signal to the sensor. Temperature compensation is provided by comparing the voltage of the sinewave signal supplied to the sensor with an external temperature stable reference voltage. The integrated circuit also includes circuitry for amplitude demodulating a signal returned from the sensor to provide a sensor output signal.

26 Claims, 12 Drawing Sheets

SINEWAVE GENERATING CIRCUIT AND AMPLITUDE DEMODULATOR

CROSS-REFERENCE TO RELATED APPLICATIONS

The present application is a continuation-in-part of application Ser. No. 07/737,389 to Munch et al. entitled "Linear Position Sensor Having Co-Axial or Parallel Primary and Secondary Windings" filed Jul. 29, 1991, now U.S. Pat. No. 5,210,490 which is a continuation-in-part of application Ser. No. 07/427,641 filed Oct. 26, 1989, now U.S. Pat. No. 5,036,275 which is a continuation-in-part of application Ser. No. 296,183 filed Jan. 11, 1989, and now U.S. Pat. No. 5,216,364.

FIELD OF THE INVENTION

The present invention concerns a sensing probe, and more particularly concerns an integrated circuit used in activating a sensor probe and monitoring a response from the sensor probe.

U.S. Pat. No. 5,036,275 to Munch et al. entitled "Inductively Coupling Position Sensor Method and Apparatus, having primary and secondary windings parallel to each other," dated Jul. 30, 1991, concerns a position sensing device. Two spaced conductive coils constitute a primary and secondary winding of a transformer. A coupling member is mounted to a movable object, such as an automobile shock absorber that extends and retracts as the automobile is driven. Movement of the coupling member alters or adjusts the transformer coupling between the primary and the secondary, and produces an output signal which can be correlated to the position of the movable object.

FIG. 10 of the '275 patent to Munch et al. discloses a schematic of circuitry for activating a probe 32 with a drive signal and determining a relative position between the primary and secondary winding and the coupling member of the probe based upon an output signal which is rectified and then amplified to produce an output 80. As seen by reference to FIG. 11, the schematic of FIG. 10 can be accomplished using discreet components that produce an output based upon a sensed condition. The disclosure of U.S. Pat. No. 5,036,275 is incorporated herein by reference.

DISCLOSURE OF THE INVENTION

Apparatus constructed in accordance with the present invention interfaces with a sensor for monitoring a sensed condition. The apparatus includes activation circuitry coupleable to the sensor for generating a modulating signal. The activation circuitry includes means for adjustably selecting a modulating signal frequency and means for adjustably selecting a modulating signal amplitude.

The monitoring circuitry demodulates a return signal from the sensor to determine a sensed condition. The monitoring circuitry includes means for amplifying the return signal from the sensor and means for filtering the modulating return signal and providing an output corresponding to the sensed condition.

The preferred embodiment of the invention is constructed using application specific integrated circuit technology. The signal generation and signal conditioning are accomplished with a lower component count, lower cost and with enhanced reliability.

A preferred, more specific embodiment of the invention includes an integrated circuit for driving a sensor having an oscillator for providing a first clock signal which is derived from a periodic waveform supplied by an external source and means for providing a second clock signal approximating a sinewave. The second clock signal is in the form of a uni-polar square wave at a pulse interval based upon said first clock signal. A sinewave generator is included to consecutively control steps of a voltage resistor ladder based upon the second clock signal. A gate responsive to the second clock signal controls the sinewave generator. The preferred embodiment also includes a low-pass filter for removing higher frequency harmonics generated by switching through the steps of the resistor ladder. A linear amplifier which utilizes an external capacitor to capacitively couple the uni-polar sinewave signal to the sensor is included as well as temperature compensation structure for controlling the temperature across the circuit by comparing the voltage of the sinewave signal supplied to the sensor with an external temperature stable reference voltage. The preferred embodiment further includes DC bias voltage structure for referencing at or above ground the output leads from the sensor. A track and hold circuit measures a return signal from the sensor. The preferred embodiment further includes an output driver which includes a low pass filter for removing harmonics from the return signal. The return signal is adjusted to a desired voltage through gain and offset.

An alternate embodiment of the present invention includes an integrated circuit for driving a sensor having an oscillator for providing a first clock signal which is derived from a periodic waveform supplied by an external source. A second clock signal in the form of a uni-polar square wave at a selected frequency is provided based upon the first clock signal. A gate controls a constant amplitude voltage supply in response to the second clock signal. A first low-pass filter means converts the second clock signal from the square wave to a sinewave which drives the sensor. The integrated circuit further includes means for amplifying a return signal from the sensor, a full wave rectifier for rectifying the return signal, and a second low-pass filter for removing harmonics from the return signal created by the rectifier.

The above and other features of the invention will be better understood from the detailed description that follows, when considered in connection with the accompanying drawings.

DETAILED DESCRIPTION OF THE PREFERRED EMBODIMENTS

Figure 1:
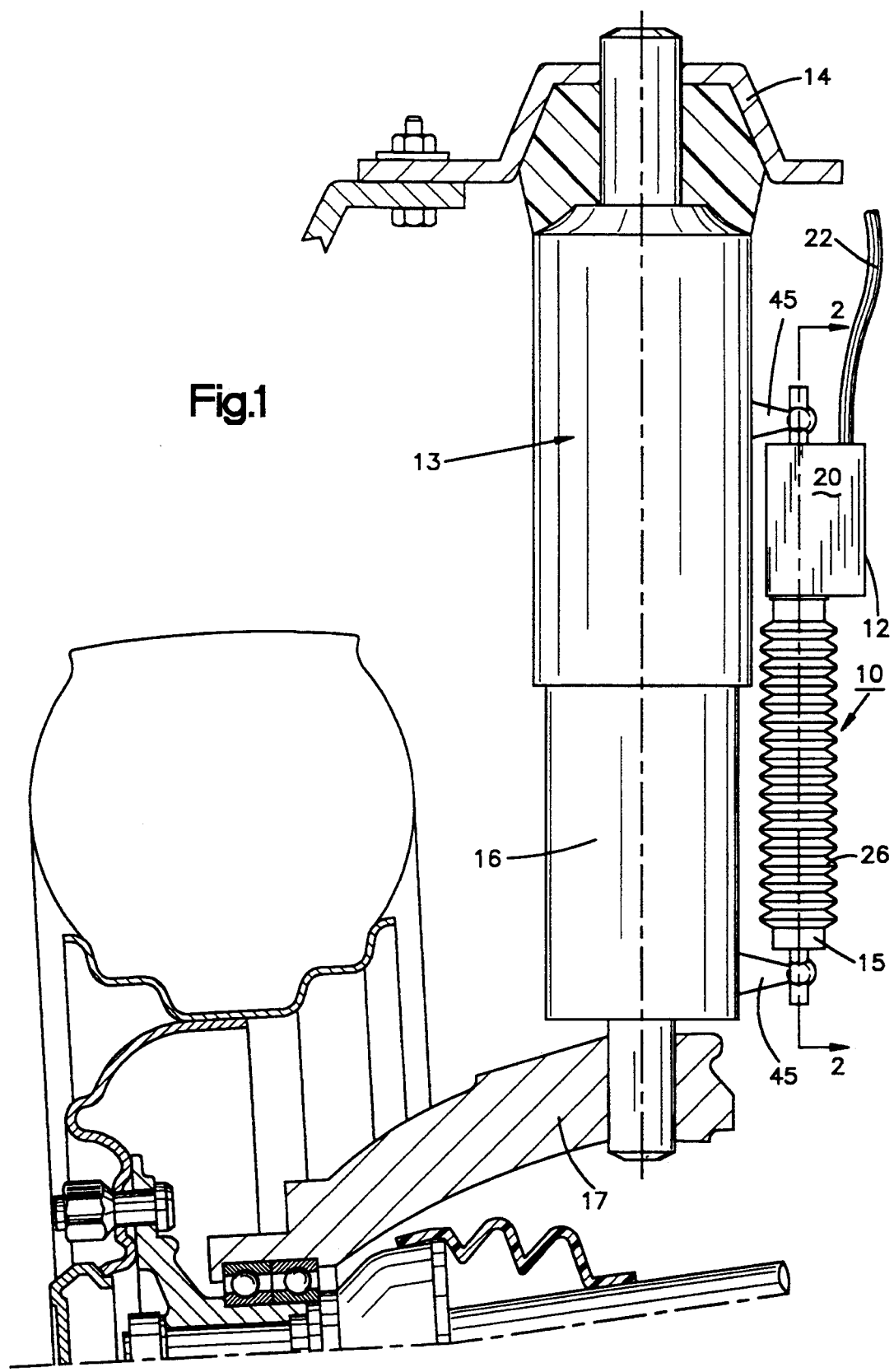
FIG. 1 is a partially sectioned side view of a non-contact position sensor coupled to a vehicle shock absorber.

An example of a position sensor for use with the invention is found in U.S. Pat. No. 5,036,275. By referring to FIGS. 1 and 2, a brief description of one embodiment of a representative position sensor 10 can be understood.

Position Sensor

A non-contact position sensor 10 includes a base portion 12 attached to one portion of a vehicle, such as the portion of a shock absorber 13 attached to a vehicle chassis 14, and a tracking portion 15 which is attached to a portion of the vehicle whose position it is desired to sense, such as a portion 16 of a shock absorber attached to a wheel support assembly 17. The base and tracking portions 12, 15 are relatively longitudinally moveable with respect to each other and are external to the shock absorber 13.

The base portion 12 further includes a housing 20 that supports a circuit 100 (FIG. 3) for generating position-indicating signals and transmitting those signals via a cable 22 to a vehicle ride control computer. In a preferred design, an electrical connector 23 (FIG. 2) attached to the cable 22 engages a mating connector (not shown) for connection to a ride control computer and provides input and output interconnection for the position sensor 10.

Figure 2:
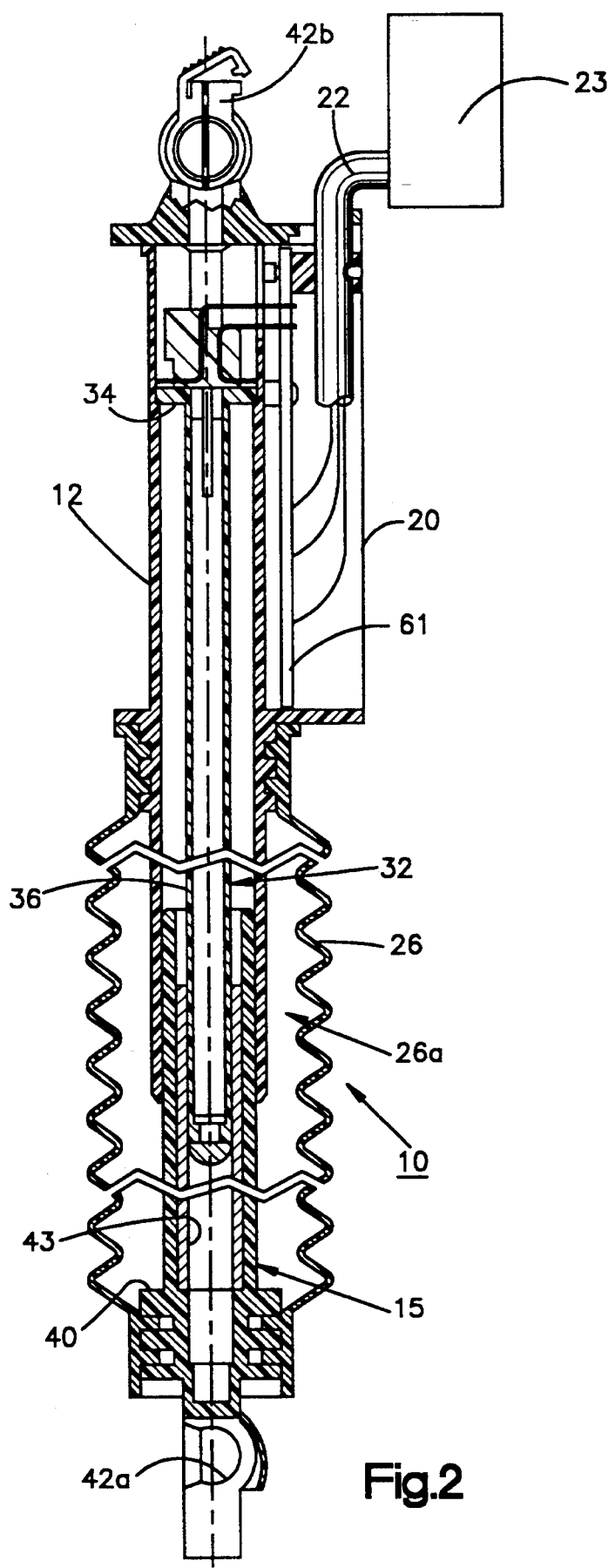
FIG. 2 is an enlarged sectional view of the position sensor as seen from the plane defined by the line 2—2 in FIG. 1.

A flexible cylindrical bellows 26 is coupled at one end to the sensor's base portion 12 and at an opposite end to the sensor's tracking portion 15 and defines an external chamber 26a (FIG. 2). A winding assembly 32 extends from the base portion 12 into a region surrounded by the bellows 26. The winding assembly 32 includes a proximal end portion 34 fixed to the sensor base portion 12 and a distal sensing portion 36 positioned within the bellows 26.

The sensor tracking portion 15 includes a support 40 for a transformer coupling member that includes an elongated tubular conductor 43. The tubular conductor 43 has an inner diameter selected to freely slide over an outer diameter of the winding assembly 32. The support 40 includes a fitting 42a for attachment of the sensor tracking portion 15 to a mounting stud 45 (FIG. 1) of the shock absorber. A similarly constructed fitting 42b attached to the sensor base portion 12 allows the sensor 10 to be attached to a second mounting stud 45 attached to the shock absorber.

Figure 3:
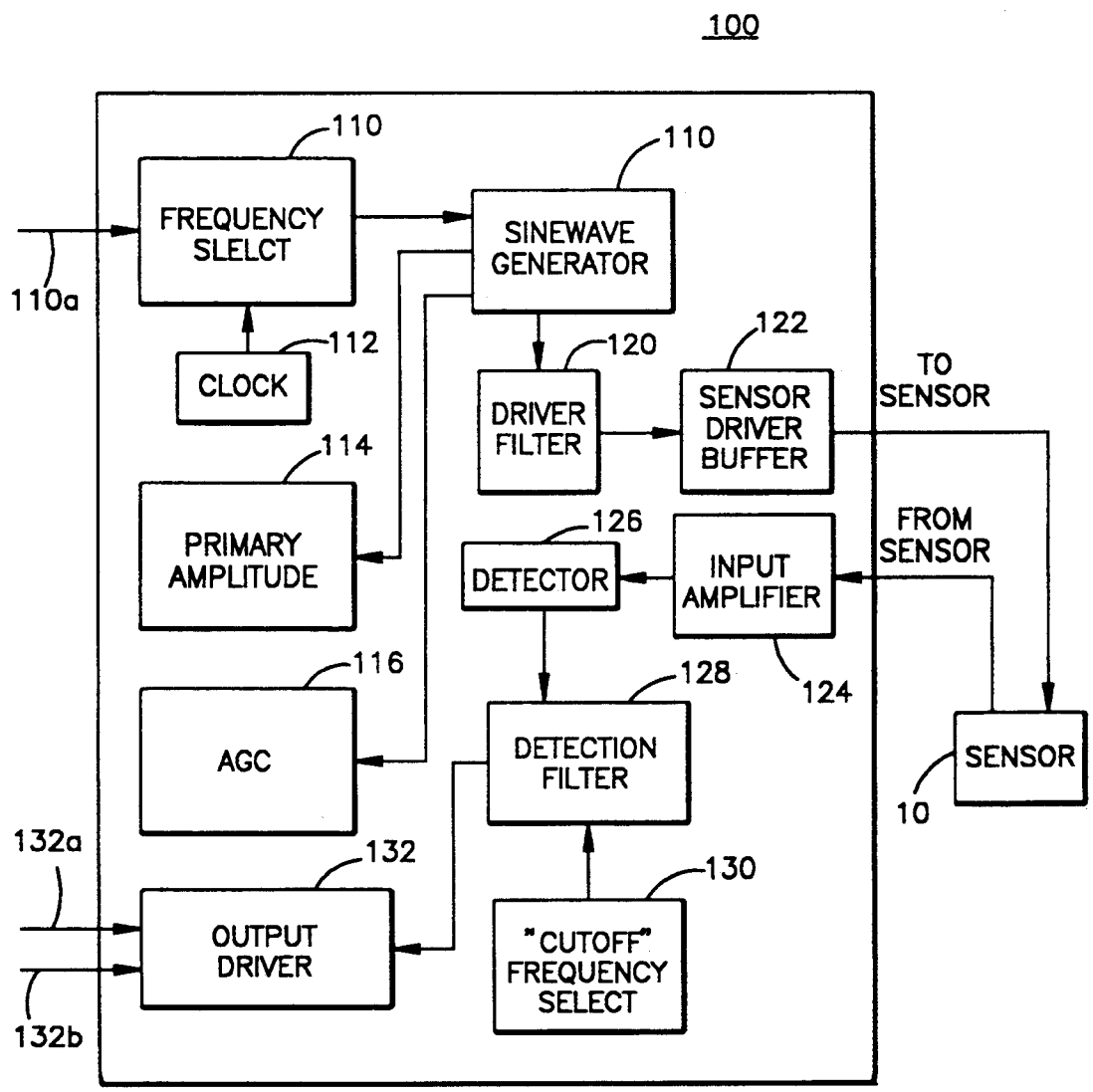
FIG. 3 is a functional block diagram illustrating operation of a circuit constructed in accordance with the invention.

FIG. 3 illustrates components in block diagram form of an integrated circuit 100 embodying the present invention. An integrated circuit 100 generates a constant amplitude monofrequency sinewave which can be used to drive a sensor. The circuit 100 can be used with any sensor which transduces by providing an output derived from a sinewave input whose amplitude is modulated proportionately to the property that a sensor is measuring. Sensors can be used to measure rotation, stress, force, displacement, temperature and other properties. The relation between an input to a sensor and an output from a sensor is graphically demonstrated in FIGS. 6 and 7 where an example of the time variation of a property to be measure by a sensor (FIG. 6) and the sensor's amplitude modulated return signal (FIG. 7) are shown. In the example portrayed in FIGS. 6 and 7, the sensor is driven with a 12 KHz sinewave. Referring to FIG. 3, the sensor's amplitude modulated output is fed to a detection portion of the circuit 100 which demodulates the signal and produces an output voltage proportional to the signal amplitude which, in turn, is related to the measurement made by a sensing device.

The circuit 100 includes a frequency select stage 110 that is controlled by a clock 112. An automatic gain control stage 116 acts upon and adjusts the sinewave generator output to track the primary amplitude select 114. Signals from the frequency select stage 110 and primary amplitude select stage 114, are supplied to a sinewave generator 118. The sinewave generator 118 sends a signal to a driver filter 120 which, in turn, sends a signal to a sensor driver buffer 122 with the resulting signal used as the output drive signal.

The action of a sensor is to modulate the drive signal with a signal proportional to the property measured. A return signal from the sensor is fed to an input amplifier 124 and then passes to a detector 126. The detector 126 demodulates the return signal. Various techniques are available for this demodulation and are known to those skilled in the art. Extraneous frequency components are removed by a low-pass detection filter 128 that is incorporated all or partially in output drive amplifier 132. The filter cut-off frequency is controlled by external components in the feedback loop of the output drive amplifier 132. The output drive amplifier 132 feedback network is further configured to achieve a "voltage follower" operation with gain and offset controlled by external components.

The clock signal from the clock 112 is reduced according to a frequency select input 110a by the frequency select stage 110. Frequency selection allows the circuit 100 to more closely match the requirements of a given sensor. Input from the amplitude setting stage 114 along with the frequency adjusted clock signal are passed to the sinewave generator 118. The sinewave generator then produces a sinewave of the desired frequency and amplitude. The sinewave is filtered at the driver filter 120 to reduce harmonic distortion and is then buffered at the sensor driver buffer stage 122. An output signal from the driver buffer stage 122 is then used to drive a sensor.

Figure 6:
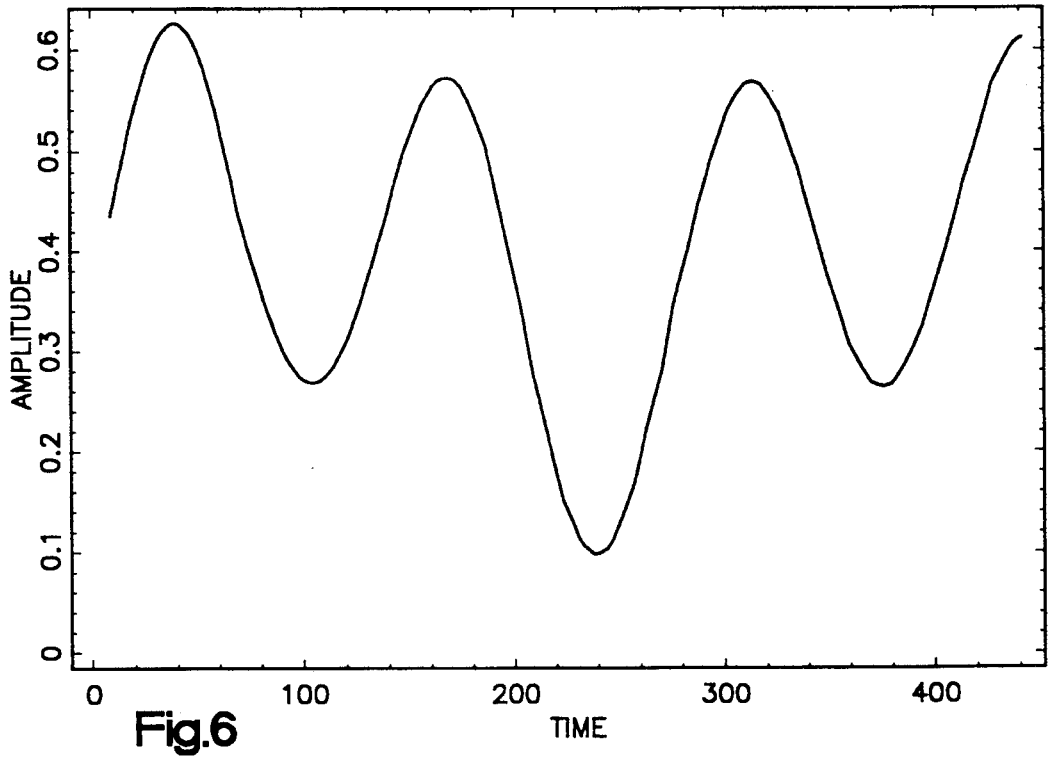
FIG. 6 is a graph showing variation of a parameter measured by a sensor as that parameter varies with time.
Figure 7:
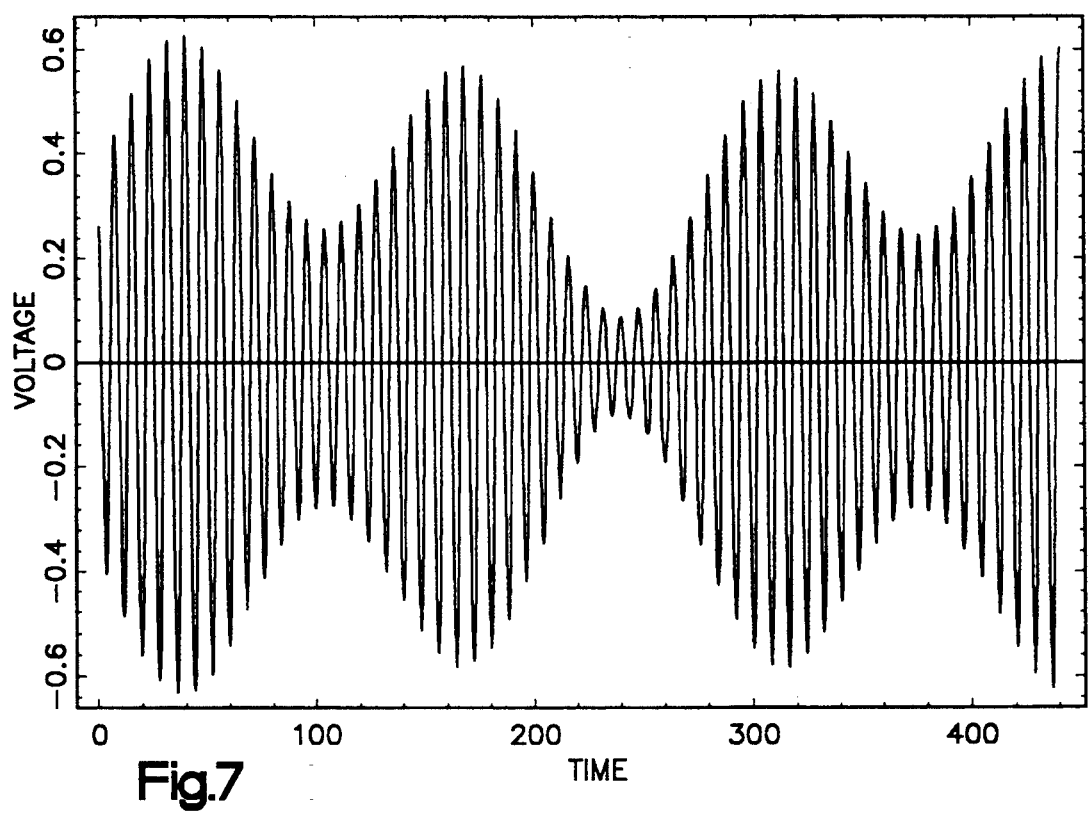
FIG. 7 is a graph showing a modulating signal returned from a sensor monitoring the FIG. 6 parameter.

The return signal from a sensor is an amplitude modulated derivative of the sinewave signal used to drive the sensor. The modulation, in turn, is related to the property being measured, as shown in FIGS. 6 and 7. FIG. 9 is the Fourier transform of the sensor output signal. The return signal is amplified by the input amplifier 124, and the resulting signal passed to the detector 126.

Figure 8:
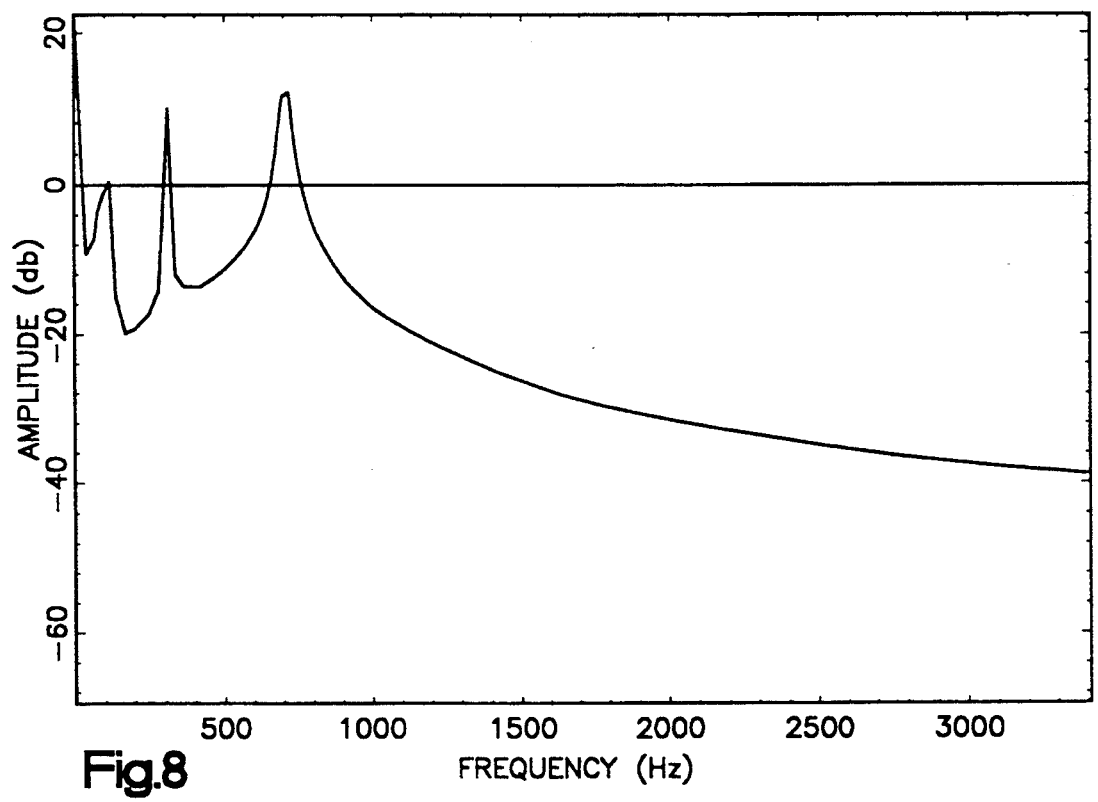
FIG. 8 is a depiction of the Fourier transform to a frequency domain of the FIG. 7 time-varying parameter with scales of power vs. frequency.
Figure 9A:
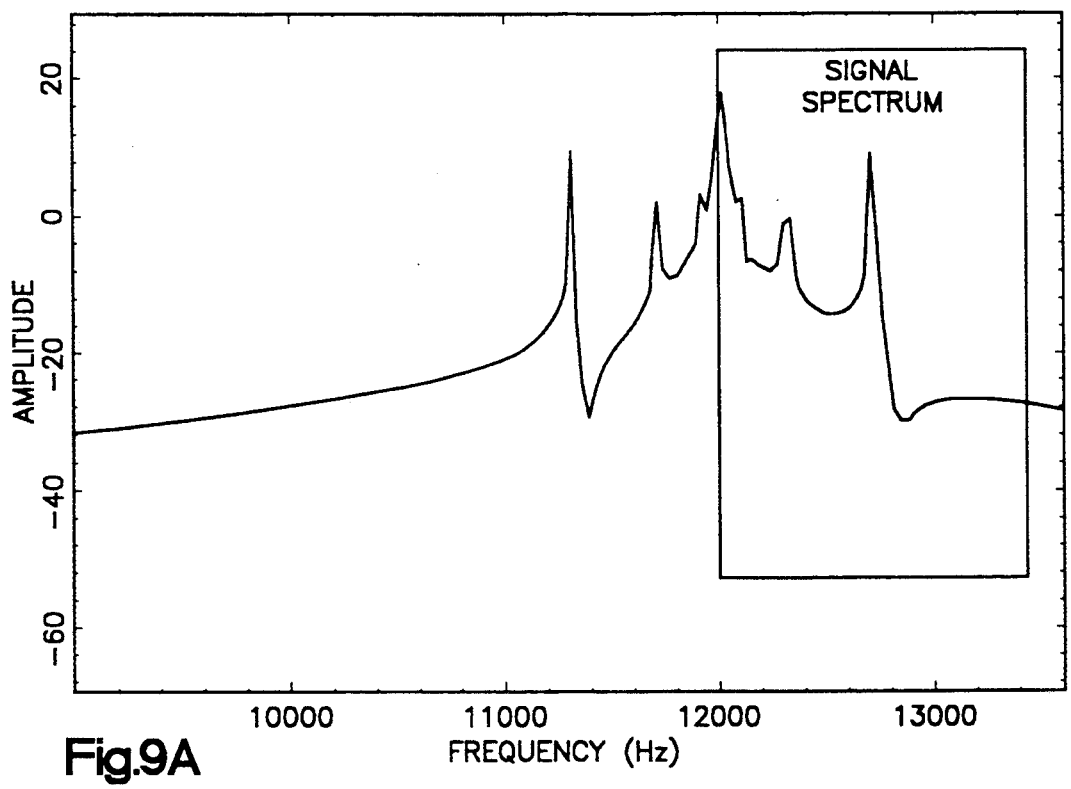
FIG. 9a is a Fourier transform of the signal output from the sensor shown in FIG. 8.
Figure 9B:
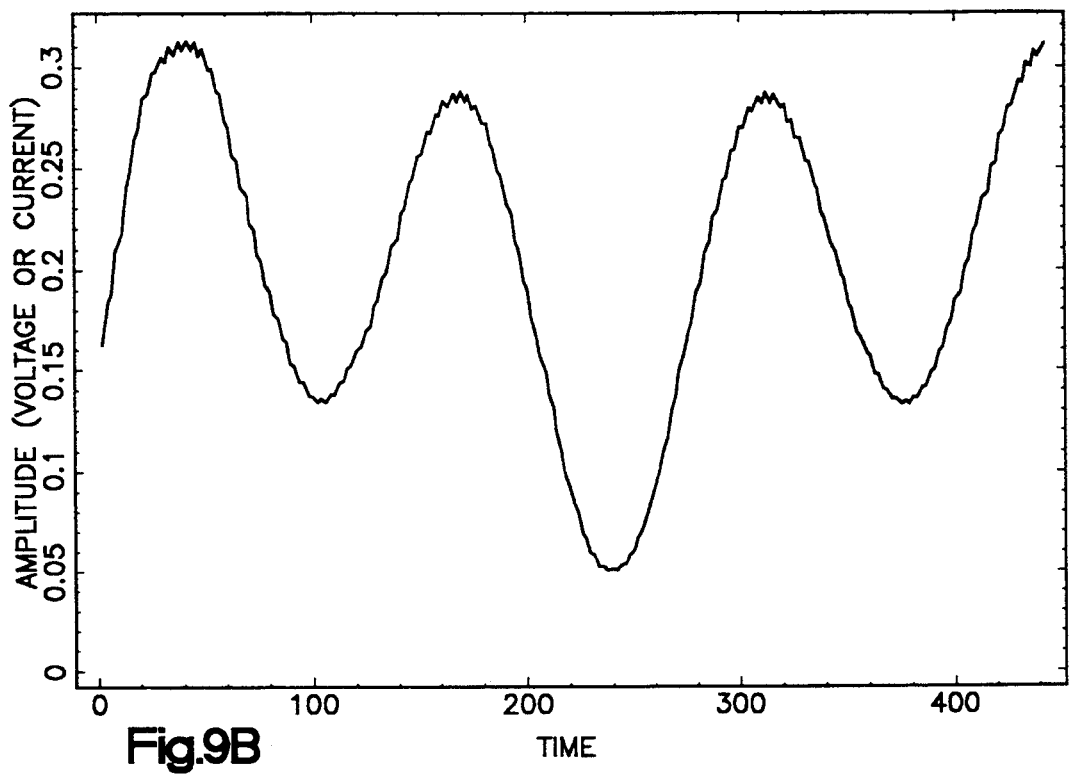
FIG. 9b is a representation of the amplitude demodulated sensor signal with some harmonics present.
Figure 9C:
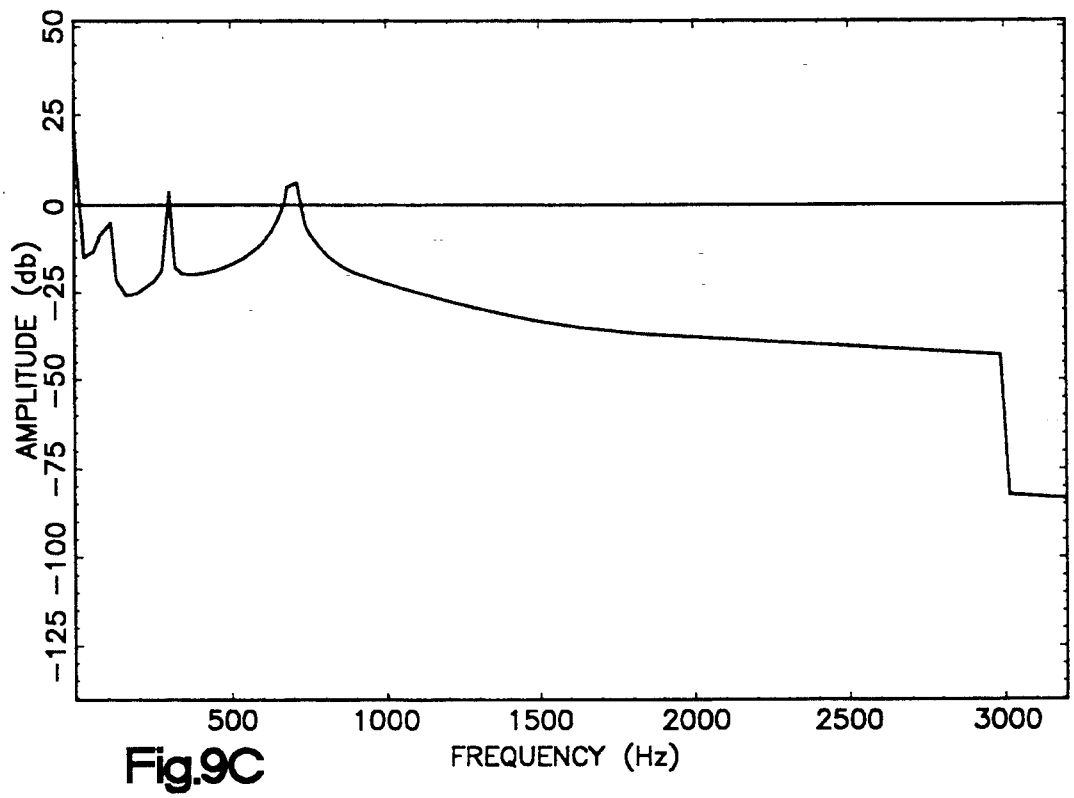
FIG. 9c is a Fourier transform of the demodulated sensor signal shown in FIG. 9b.

FIG. 6 shows the "property vs. time" variation of a sample property to be measured, where the property could be displacement, rotation, pressure, etc. In FIG. 8, the frequency spectra of that time variation is shown. As seen, the "property vs. time" variation has frequency components centered at approximately 100, 300 and 700 Hz. The voltage output of a sensor sinusoidally driven at 12 KHz that amplitude modulates in proportion to the property being measured is shown in FIG. 7. The corresponding frequency spectra of that voltage output is shown in FIG. 9a. Comparison of the spectra in FIG. 8 to that of FIG. 9a shows that the sensor electrically replicates the spectral pattern of the property measured, but at a frequency range that has been shifted by 12 KHz, the frequency at which the sensor was driven. Additionally, the sensor also produces a reversed version of the spectral pattern of the property measured which is seen just below 12 KHz. These effects of amplitude modulation are well established in communications and signal processing theory and presented in the literature. The net effect of an amplitude modulating sensor is to produce a "voltage vs. time" image of a "property vs. time" variation that is measured. However, the "voltage vs. time" image appears at a frequency range that has been shifted by a frequency equal to that of the sinusoid driving the sensor. The action of the detector 126 is to demodulate the sensor's output signal. Demodulation removes both the frequency shift and "reversed" spectra from the sensor signal. This results in a "voltage vs. time" variation that is directly proportional to the "property vs. time" variation that the sensor measured. The demodulated signal from the detector is then fed through a low-pass filter to remove any harmonics created by the demodulation. The cut-off frequency of the filter is set in 130. The corresponding "voltage vs. time" and a portion of the frequency spectra of the output of 128 are shown in FIGS. 9b and 9c. Numerous methods for amplitude demodulation and low-pass filtering are established in the field of electronics and are well documented in the associated literature. The basis of this invention is in cost/performance optimization achieved by a particular combination(s) of techniques for the generation of the drive sinewave and the demodulation of the sensor signal.

The filtered signal is then passed to the output driver 132. The final output is a voltage signal from the driver 132 that is scaled appropriately by external gain and offset setting inputs 132a, 132b.

Alternate applications of the IC arise from the ability to switch frequencies (via the frequency select) and vary the driver amplitude. The frequency control enables the IC to operate as a line driver in a frequency shift keying communication system. The drive amplitude control allows the IC to be used directly as a line driver and receiver in an amplitude modulation communications system.

Figure 4:
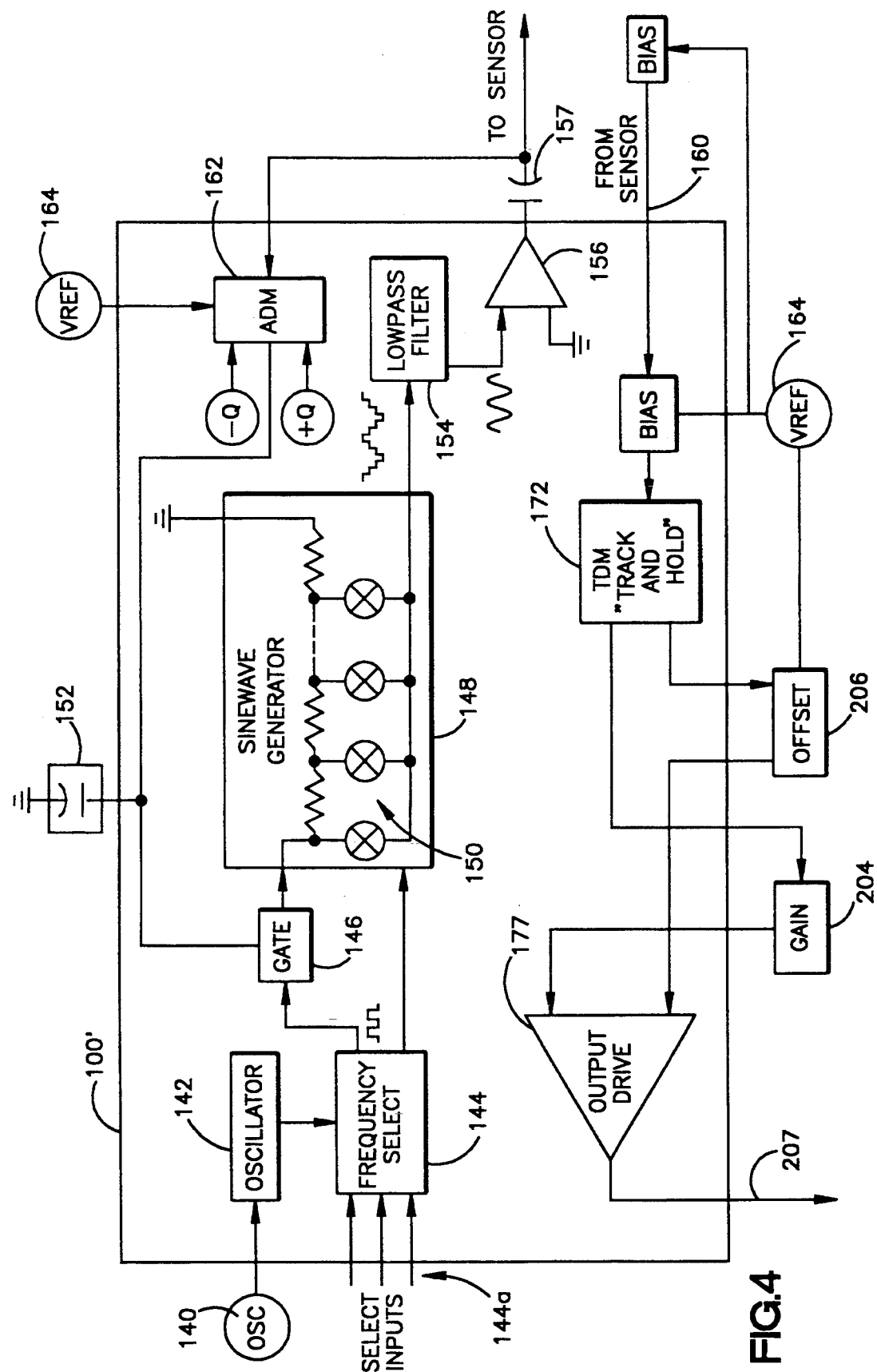
FIG. 4 is an electrical circuit diagram in block form of a first preferred embodiment of this invention.

FIG. 4 depicts the preferred embodiment of the invention. An oscillator circuit 140 feeds a periodic waveform to an oscillator 142 within the integrated circuit 100' to provide a clock signal. The clock signal is passed to a frequency select stage 144 which generates a second clock signal based on frequency select inputs 144a. A divide-down counter controlled by the frequency select inputs 144a outputs a uni-polar square wave having a frequency that is a fraction of the output frequency of the oscillator 142.

A gate 146 is controlled by the second clock signal and gates a sinewave generator 148 to produce a uni-polar (DC offset) approximation of a sinewave at the selected frequency. The sinewave generator 148 uses the clock signal to consecutively gate steps on a voltage divider resistor ladder 150. The voltages at the steps on the ladder 150 are set to enable signal generation at the desired frequency, i.e., a sinewave approximation at the selected frequency. The sinewave approximation is actually a stepped curve having thirty-two steps per period.

The amplitude of the sinewave approximation is controlled by a voltage which is maintained on an external capacitor 152. This voltage controls the voltage that is applied across the voltage divider resistor ladder 150.

A low-pass filter 154 with all its components located on the integrated circuit 100' removes higher frequency harmonics generated by switching through the steps of the voltage ladder 150. The low-pass filter 154 smoothes the stepped curve into a sinewave.

A linear amplifier 156 follows the low-pass filter 154 and uses an external capacitor 157 to capacitively couple the uni-polar sinewave signal to a ground referenced sensor 10. This results in a bi-polar sinewave drive without resorting to a bi-polar supply to the IC. Therefore, the sinewave now has a positive and negative amplitude whereas, when the curve was a step sinewave approximation, there was no negative amplitude.

The primary drive amplitude is monitored by feedback 162a from the sensor 10 into an adaptive delta modulation (ADM) circuit 162. Every 32nd clock pulse, the circuit 162 is enabled to compare the voltage applied to the sensor 10 with voltage on an external reference voltage source 164. If, over a complete cycle, the sensor drive voltage exceeds the reference voltage, a fixed amount of charge is removed from the external capacitor 152 by the circuit 162, thereby decreasing the amount of voltage supplied to the voltage ladder 150. When over a complete cycle, the sensor drive voltage fails to come above the reference voltage, a fixed amount of charge is pumped into the external capacitor 152 by the circuit 162, thereby increasing the amount of voltage supplied to the sinewave generator ladder 150. If the consecutive charge cycles fail to bring the sensor drive voltage above the reference voltage, the charge increment is increased to a larger value and maintained until the sensor drive voltage exceeds the reference voltage. When the reference voltage is exceeded, the charge increment drops back to the initial quantity. This procedure allows the circuit 100' to rapidly build up charge on the external capacitor 152 upon power-up of the circuit and then follow the reference voltage thereafter by adding or subtracting a small fixed amount of charge.

The return signal 160 from a sensor is given a DC bias voltage of approximately 0.5 volts from an external voltage source 164.

Figure 9D:
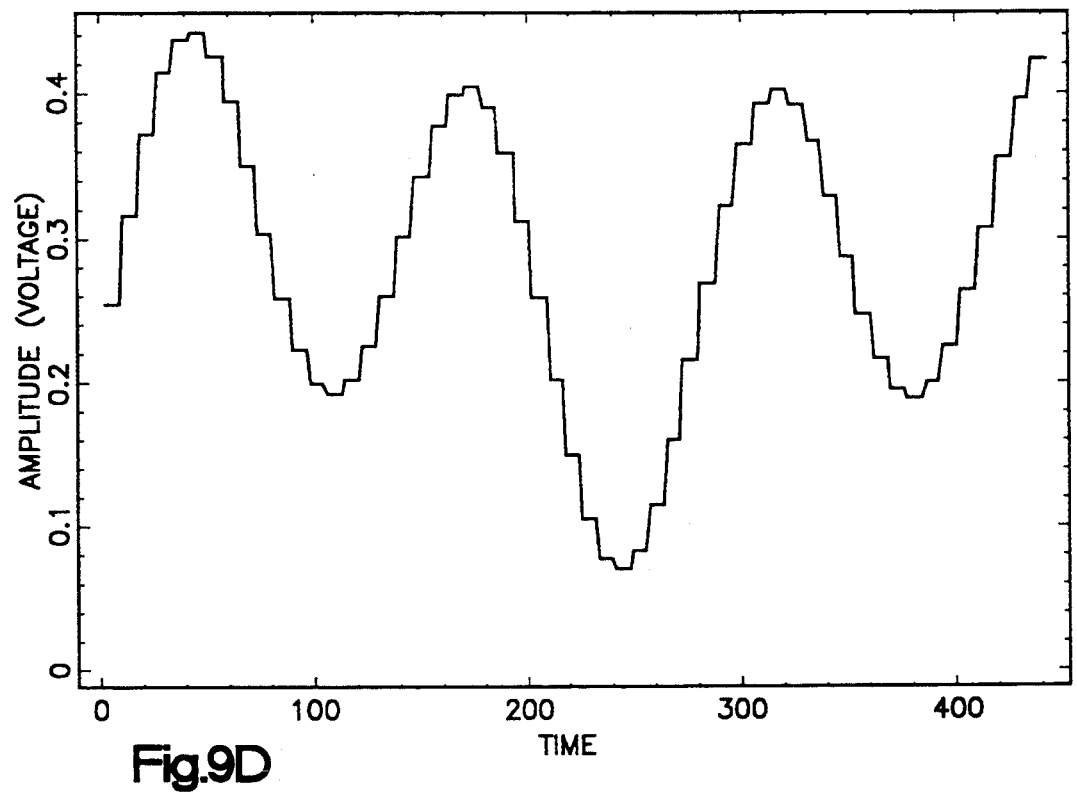
FIG. 9d is a representation of the output of the track and hold detector of the preferred embodiment.

The track and hold circuit 172 outputs a voltage proportional to the peak voltage of the incoming waveform. This voltage is updated every cycle and is held constant between updates. The result is a stepped approximation of the desired demodulated signal as shown in FIG. 9d. Technically, this is a form of "under sampling" which is well discussed in the literature.

Figure 5:
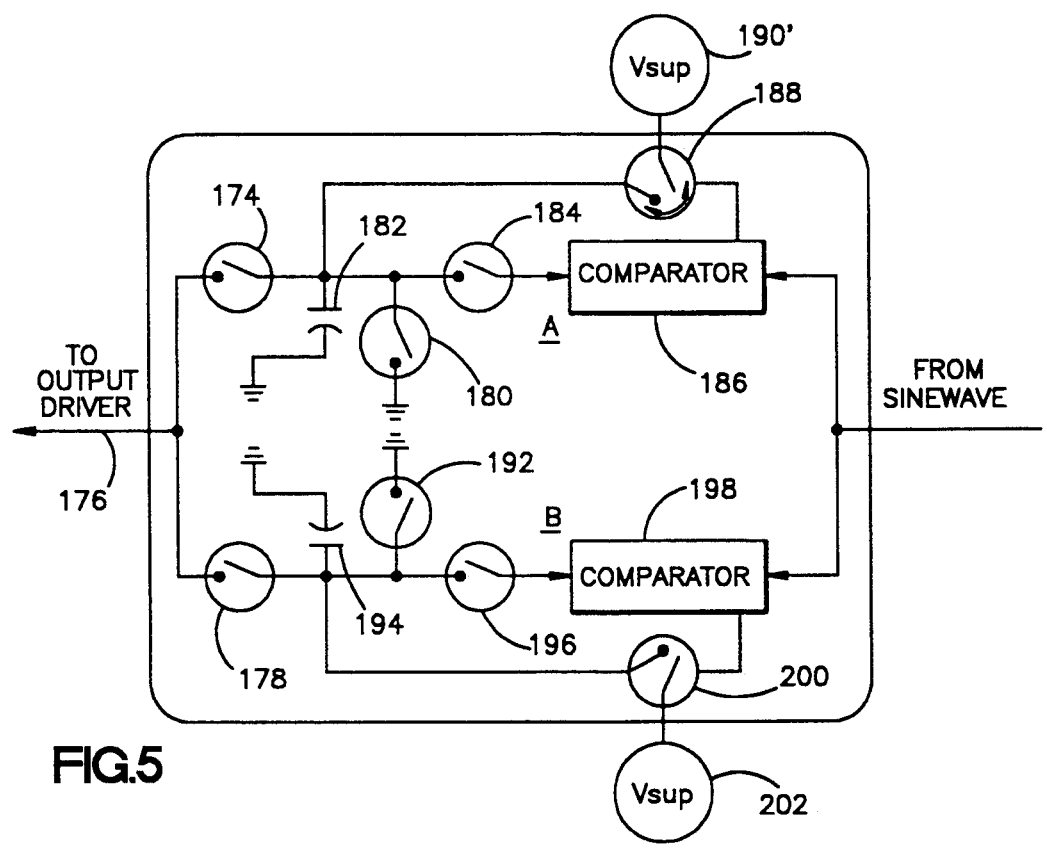
FIG. 5 is a schematic representation of the track and hold detector circuit of the second preferred embodiment illustrated in FIG. 4.

FIG. 5 depicts a schematic representation of the track and hold detector circuit which is comprised of two identical peak detection circuits "A" and "B". A switch 174 is opened to disconnect circuit A from output 176 on alternate positive going cycles of the incoming waveform. Simultaneously, the alternate peak detector B is connected to the output 176 via a switch 178. A reset switch 180 is then closed to discharge a tracking capacitor 182 of circuit A to ground and afterwards is immediately reopened. A switch 184 closes to connect voltage stored in the tracking capacitor 182 to a comparator 186. When the sine wave voltage from the sensor 10 is greater than the voltage on the tracking capacitor 182, a switch 188 is closed to allow a power supply 190' to charge the tracking capacitor 182 to the voltage of the incoming sinewave. This continues until the voltage of the incoming sinewave peaks. On the next negative going incoming sinewave cycle, the roles of the two track and hold circuits A, B are reversed and the output switch 174 is closed to reconnect the A circuit with the output 176 and the switch 178 opens to disconnect circuit B. Circuit B operates in an identical manner. The switch 178 is opened to disconnect circuit B from the output 176 alternate (to circuit A's) positive going cycles of the incoming sinewave. A reset switch 192 is then closed to discharge a tracking capacitor 194 of circuit B to ground and afterwards is immediately reopened. A switch 196 is closed to connect voltage stored on the capacitor 178 to the comparator 194. When the sinewave voltage is greater than the voltage of the tracking capacitor 194, a switch 200 is closed to allow a power supply 202 to charge the tracking capacitor 194 to the voltage of the incoming return signal sinewave. The two circuits A, B alternate in operation so that a stable signal is provided to the output 176. Circuit A will receive the return signal and charge the capacitor 182 up to the amplitude of the return signal from the sensor. Once the amplitude is reached, the circuit switches and circuit B will track the return signal until the next positive amplitude is reached, charging up its capacitor 194. While circuit B is operating, circuit A communicates with the output 176 via switch 174. While circuit A is operating, circuit B communicates with the output 176 via switch 178.

Figure 10:
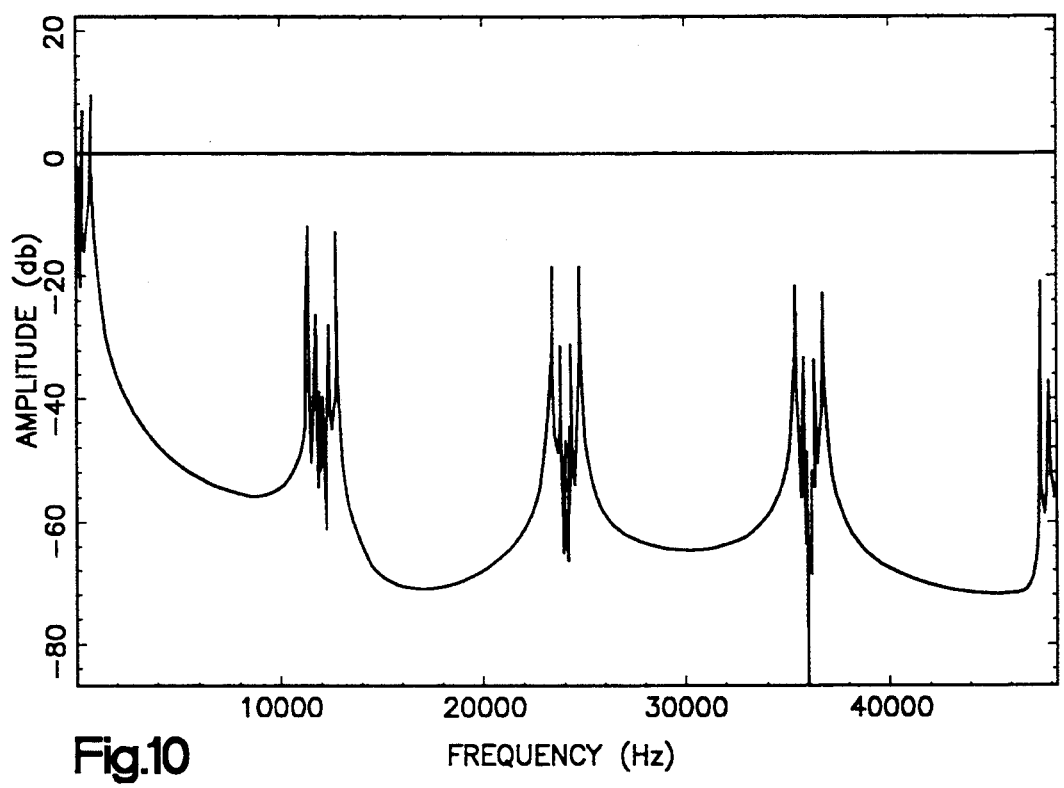
FIG. 10 is the frequency domain representation of the output of a time multiplexed track and hold sensor shown in FIG. 6.
Figure 11:
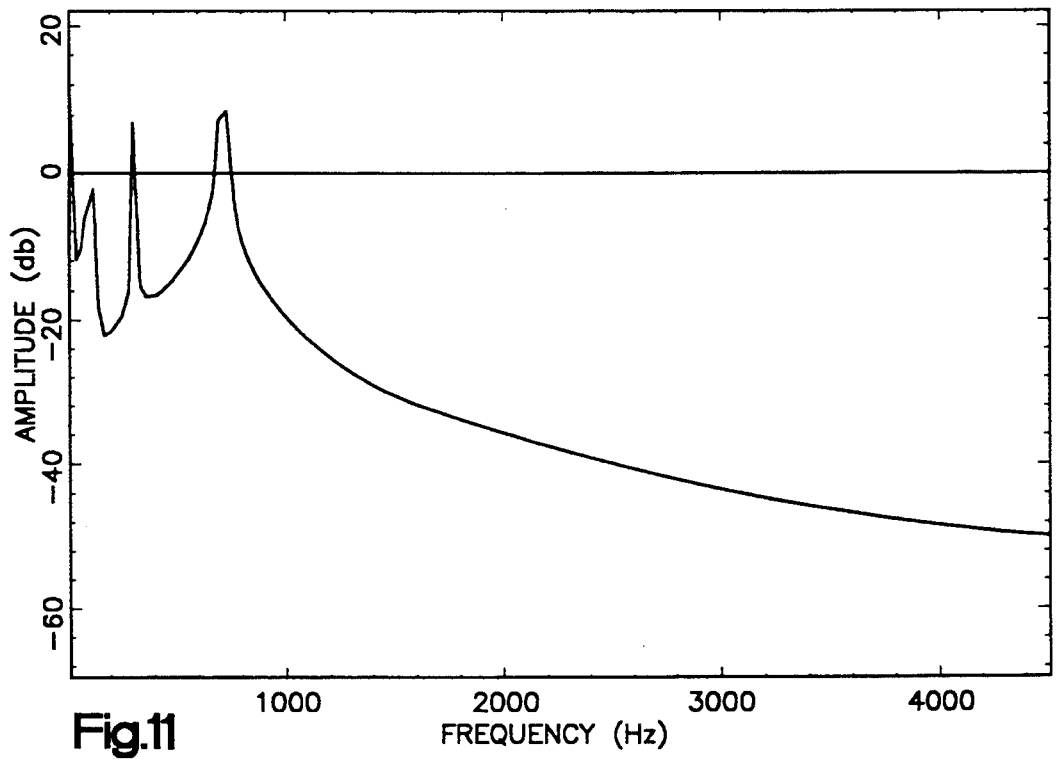
FIG. 11 is a portion of the frequency domain representation of FIG. 10.
Figure 12:
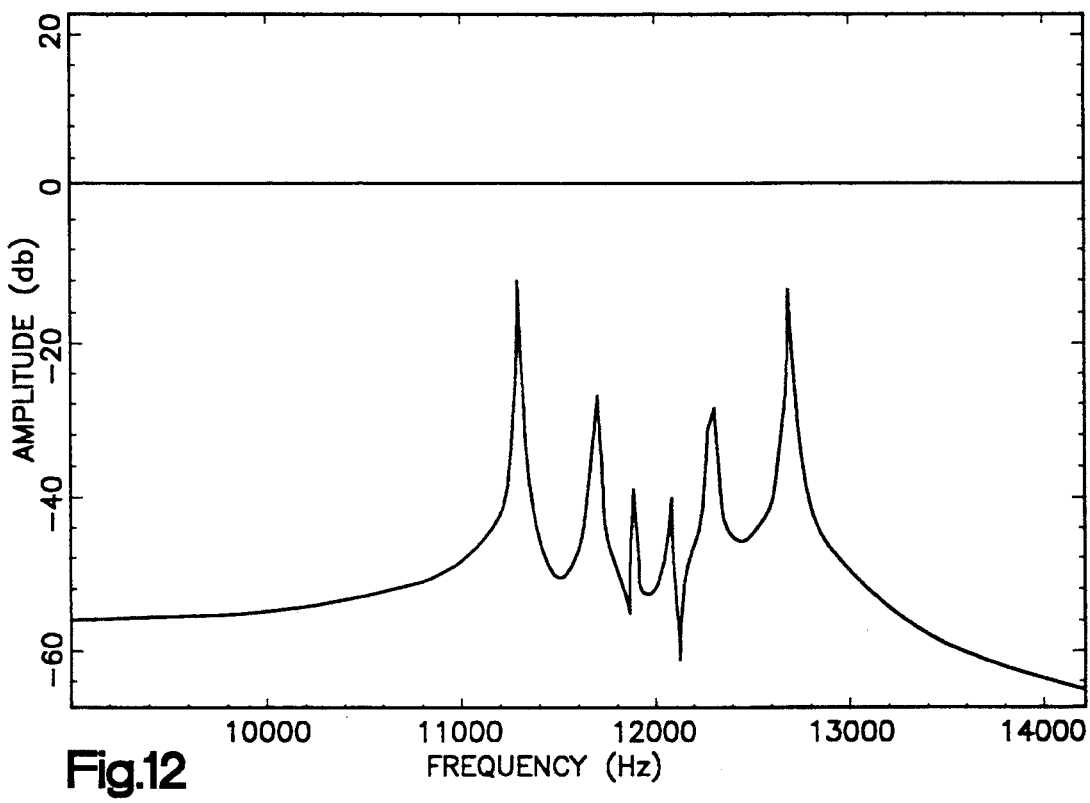
FIG. 12 is a frequency domain representation of the output of the time multiplexed track and hold detector of FIG. 5 over the first harmonic bandwidth.

Step discontinuities result from the action of switches 174 and 178 when the roles of A and B are interchanged as shown in FIG. 9d. The frequency spectra of the "stepped" signal produced by the track and hold circuits is shown in FIGS. 10 and 11. As seen the spectra of the property being measured appears in the 0 to 1 KHz range (as desired) along with harmonics (spectral images) at shifted frequencies that are multiples of the 12 KHz frequency used to drive the sensor. Portions of the output spectra of the detector showing the desired signal and first harmonic are presented in FIGS. 11 and 12, respectively. As seen, the amplitude of the harmonic is reduced relative to that of the desired signal. A low-pass filter configured in the feedback network of output driver 177 effectively removes the harmonics to isolate the desired signal shown in FIG. 11.

An output driver 177 (FIG. 4) receives the signal from the track and hold detector circuit 172. The output driver 177 is configured as an operational amplifier. The signal from the track and hold detector circuit 172 is adjusted appropriately with gain and offset adjustments. The gain and offset adjustments are set via connection to external passive feedback and biasing networks 204 and 206, respectively. The gain and offset are used to bring the output 207 into accordance with the specification for the apparatus which will receive the output signal. Passive components in the feedback network of the output amplifier are used to realize a low-pass filter to remove detector-induced harmonics from the output.

Figure 13:
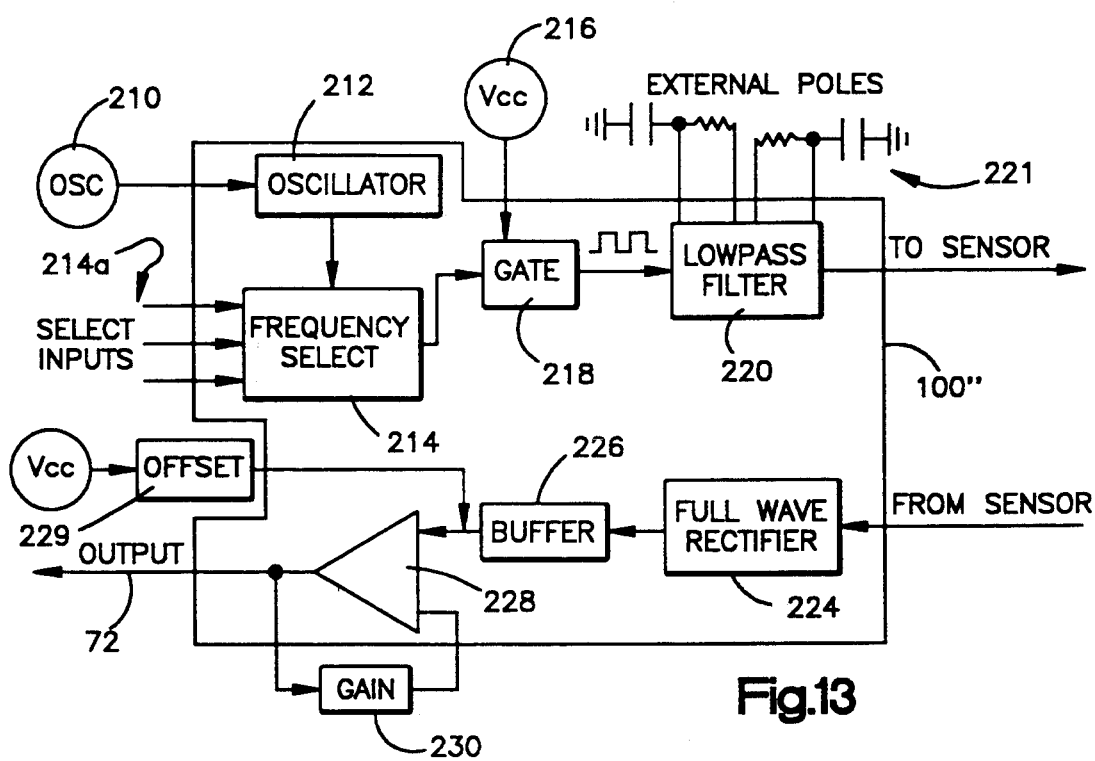
FIG. 13 is an electrical circuit diagram in the block form of the second preferred embodiment of this invention.

Referring to FIG. 13, an alternative integrated circuit 100' for practicing the invention is described. An external oscillator circuit 210 feeds a periodic waveform to an oscillator 212 to provide a clock signal. The clock signal is passed to a frequency select stage 214 which generates a clock signal at a selected frequency. As in the earlier described embodiment of FIG. 4, this is achieved by means of a divide-down counter set by external frequency select inputs 214a. The resulting signal is a uni-polar square wave which gates a constant amplitude voltage supply 216 by means of the gate 218.

This second clock signal is then passed through a low-pass filter 220 to smooth the square wave. The filter has external networks 221 to shunt high-frequency components to ground resulting in minimal power dissipation on the IC. The resulting signal from the low-pass filter 220 is then used to drive the sensor 10. The amplitude of the signal is controlled by setting the amplitude of voltage supply 216 externally.

Figure 14:
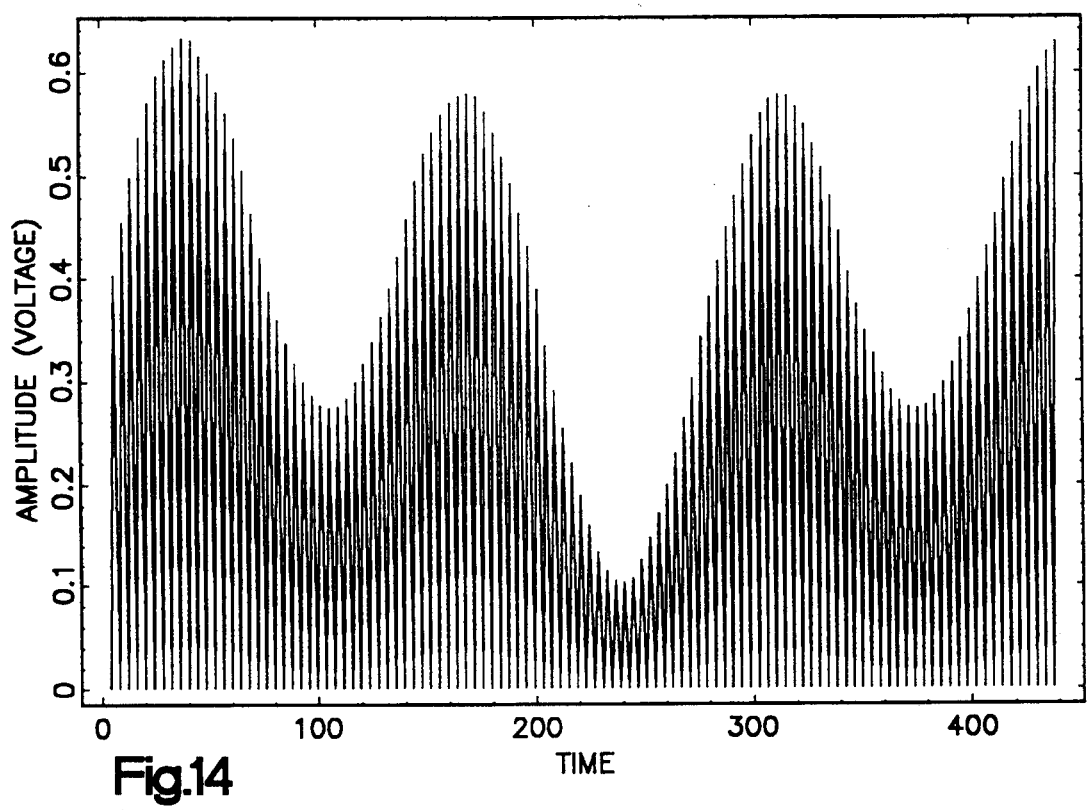
FIG. 14 is a full wave rectified sensor output signal representing the input to the buffer 226 of FIG. 5.
Figure 15:
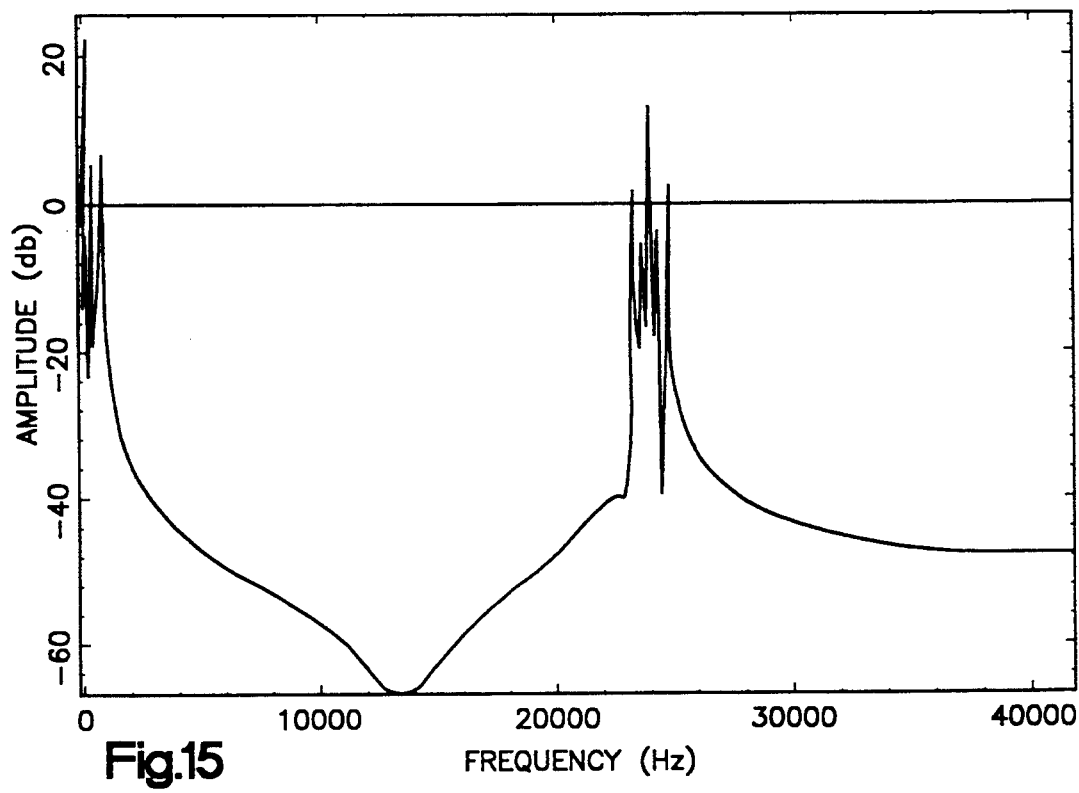
FIG. 15 is a Fourier transform of the frequency domain of a full wave rectified signal from a position sensor.
Figure 16:
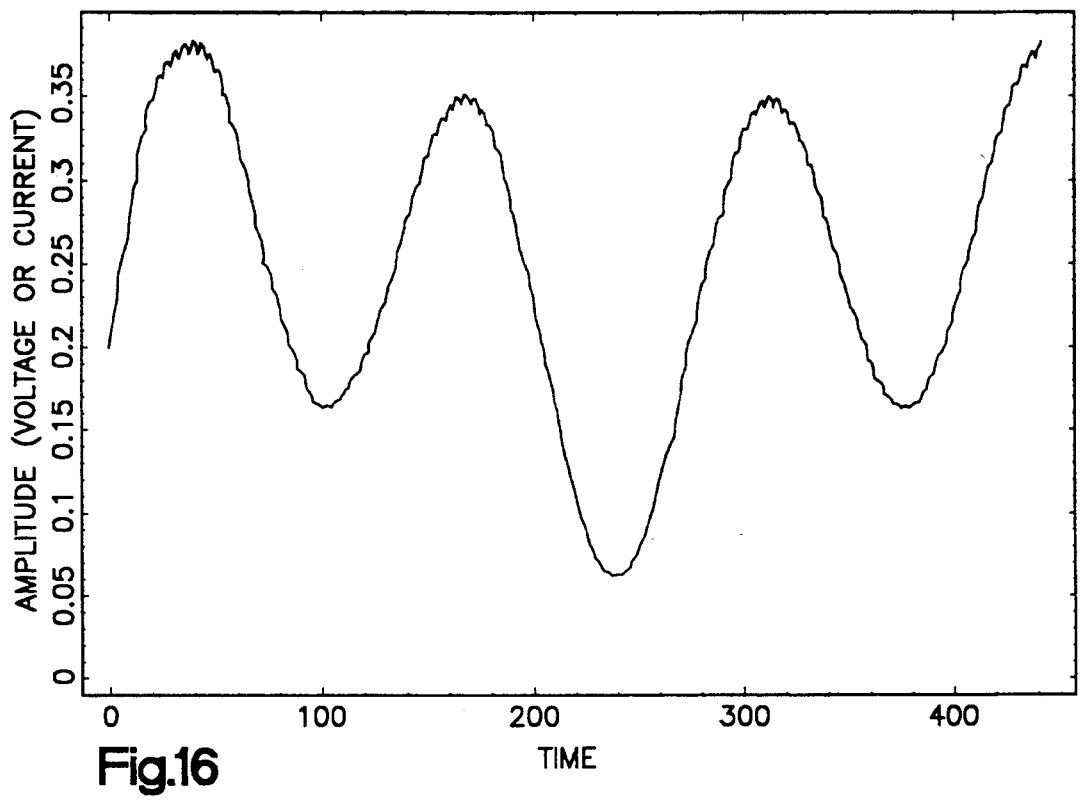
FIG. 16 depicts a filtered full wave rectified sensor output signal.
Figure 17:
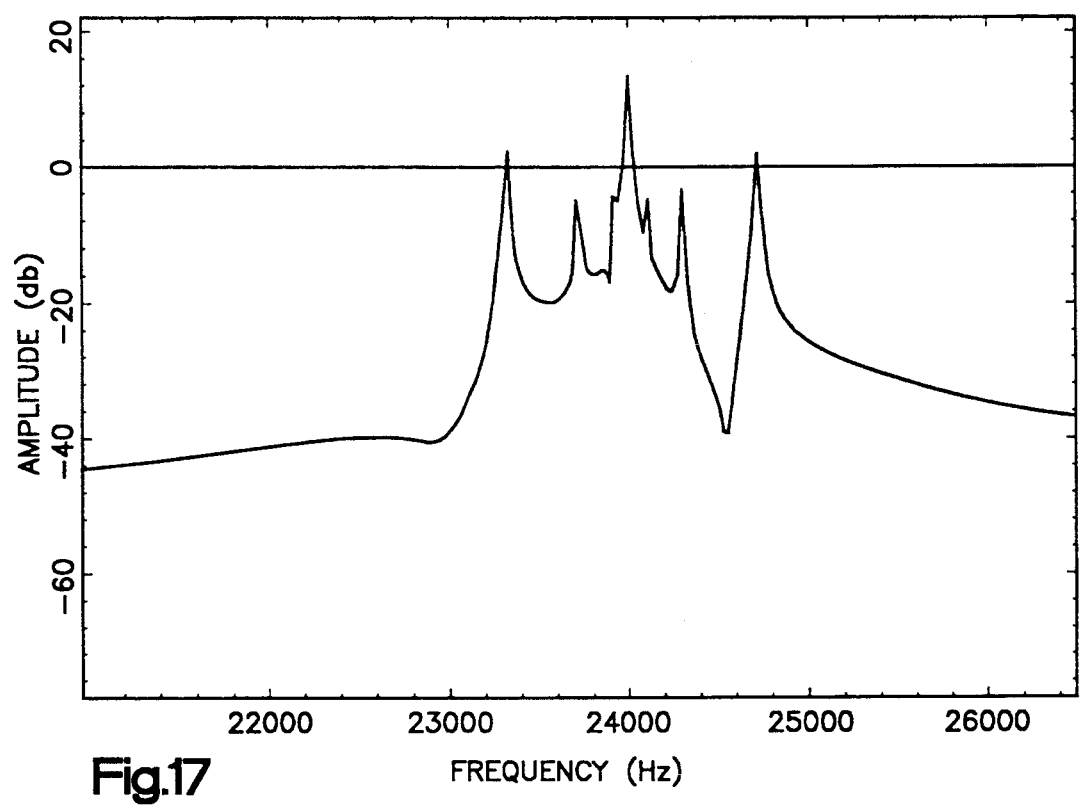
FIG. 17 is the Fourier transform of the full wave rectified sensor output over the frequency range +21 KHz to +27 KHz.

The return signal from a sensor is amplified, then passed to a full wave rectifier 224. The full wave rectifier 224 acts like a square wave mixer which appears as a time domain multiplication of the modulated sensor signal with a bipolar synchronous square wave of the same frequency. Time and frequency domain representations of the rectified sensor signal are shown in FIGS. 14, 15 and 16. In FIG. 15, the frequency spectrum of the property measured (from FIGS. 6 and 7) is shown superimposed on the rectified signal's spectrum (FIG. 14). The only difference is a scale factor. However, referring to FIG. 17, the rectification is seen to induce harmonics at multiples of the frequency of the original sinewave that drives the sensor. A buffer 226 follows the rectifier 224. Via external connections, the return signal is then passed through an external low-pass filter or through a low-pass filter implemented in a feedback network of an output driver amplifier 228. In either case, the filter removes the harmonics from the rectified signal to isolate and recover the signal shown in FIG. 16. As with the preferred embodiment, the output driver 228 is configured as an operational amplifier. The gain and offset are set via connection to external passive networks 229 and 230. The gain and offset are used to bring the signal output 231 into accordance with the specification for the apparatus which will receive the output signal.

What we claim is:

1. Apparatus for generating a low-distortion sinewave and amplitude demodulating an input time-varying signal derived from the generated sinewave or an external source and producing an output proportional to the amplitude demodulated signal with said apparatus comprising:

a) activation circuitry for generating and driving a low-distortion sinewave with said activation circuitry including an oscillator first means, a second means for selecting frequency and a third means driving the sinewave with an amplitude that is proportional to an input reference level; and b) monitoring circuity coupleable to said time-varying signal to achieve said amplitude demodulation including a means to detect the amplitude of the time-varying signal and a second means to provide a signal proportional to the amplitude with an adjustable scale of proportion.

2. The apparatus of claim 1 wherein said apparatus is incorporated in an integrated circuit where said means to detect the amplitude consists of an amplitude detector and said sinewave generation is accomplished via a resistor divider network and filter comprising:

a) a gating means to generate a first clock signal from said oscillator means;

b) a reference voltage first means applied across said resistor divider network with a second switching means to individually couple the signal at each resistor to the divider network output and a third means consisting of selected values for the resistors to limit departure from sinusoidal time variation in the resistor network divider output;

c) a gating and timing means to sequentially activate the switching means and thereby sequentially connect the signal at each resistor of the divider to the network divider output, at and for specific time intervals with said timing intervals derived from the clock signal and selected to limit departure from sinusoidal time variation in the resistor network divider output;

d) a frequency selection means to control the rate at which the divider network is switched;

e) filter means placed in series with the network divider output to remove distortion from the network divider output and thereby produce a desired approximation to sinusoidal output; and f) linear amplifier means to drive the filter output at a power level higher than that produced by the resistor divider and filter network.

3. The apparatus of claim 2 wherein said resistor network consists of a multiplicity of discrete values which are switched sequentially between the lowest and highest divider voltage to achieve near sinusoidal variation.

4. The apparatus of claim 2 where said resistor network consists of 16 discrete values which are switched sequentially between the lowest and highest divider voltage to achieve near sinusoidal variation.

5. The apparatus of claim 2 where said reference voltage is varied by gain control means to keep the output sinewave voltage amplitude proportional to an external reference voltage.

6. The apparatus of claim 5 where gain control consists of a first output sinewave amplitude detection means, a second comparison means to compare said sinewave amplitude to said external reference and a third control means to increase or decrease said voltage divider reference if said sinewave amplitude is above or below said reference voltage.

7. The apparatus of claim 6 where said amplitude detection means consists of a delta modulator detector means.

8. The apparatus of claim 6 where said amplitude detection means consists of a diode rectifier followed by a low-pass filter means.

9. The apparatus of claim 6 where said amplitude detection means consists of a diode rectifier placed in the feedback loop of an operational amplifier means.

10. The apparatus of claim 6 where said amplitude detection means consists of a sine mixer means.

11. The apparatus of claim 6 where said amplitude detection means consists of a peak detector means.

12. The apparatus of claim 11 where said peak detector means consists of a track and hold peak detector means.

13. The apparatus of claim 2 where said amplitude detector consists of a peak detector means.

14. The apparatus of claim 2 where said amplitude detector consists of a track and hold peak detector.

15. The apparatus of claim 2 where said amplitude detector consists of a diode rectifier followed by a low-pass filter.

16. The apparatus of claim 2 where said amplitude detector consists of a diode rectifier placed in the feedback loop of an operational amplifier means.

17. The apparatus of claim 2 where said amplitude detector consists of a delta modulator detector.

18. The apparatus of claim 2 where said amplitude detector consists of a sine mixer means.

19. The apparatus of claim 18 where a sinewave signal used in said sine mixer means is derived from the output of said sinewave generation means.

20. The apparatus of claim 2 where said amplitude detector is preceded by or incorporates an amplifier means.

21. The apparatus of claim 20 where said amplifier and amplitude detector present at least 50 KΩ of impedance at the detector input to the apparatus.

22. The apparatus of claim 14 where said peak detector consists of two time-multiplexed track and hold peak detectors followed by a filter means to eliminate switching noise.

23. The apparatus of claim 2 where said linear amplifier means consists of a negative feedback amplifier circuit.

24. The apparatus of claim 23 where said negative feedback amplifier circuit consists of an operational amplifier incorporated in the integrated circuit and having the non-inverting, inverting and output lines pin accessible.

25. The apparatus of claim 2 where said frequency selection means consists of a divide-down counter to divide down from the first clock signal and thereby generate a second lower frequency clock signal from among a multiplicity of pin selectable divide-down ratios.

26. The apparatus of claim 25 wherein said divide-down counter provides eight possible frequencies via three pins that are programmed via "pull-up" resistors or leads to a reference voltage logic level or "pull-down" resistors or leads to ground.

* * * * *